United States Patent
Lapikas et al.

[11] Patent Number: 6,015,519
[45] Date of Patent: Jan. 18, 2000

[54] DENSIFIED COATING PROCESS AND MOLDED ARTICLES HAVING DENSIFIED OUTER SURFACE

[75] Inventors: James S. Lapikas, Sharpesville; John B. O'Connor, Newcastle, both of Pa.

[73] Assignee: Pyramid Composities Manufacturing Limited Partnership, Greenville, Pa.

[21] Appl. No.: 08/431,611

[22] Filed: May 1, 1995

[51] Int. Cl.$^7$ .............................. B29C 41/08; B29C 41/22
[52] U.S. Cl. ........................... 264/74; 264/122; 264/245; 264/255; 264/257
[58] Field of Search .............................. 264/73, 74, 112, 264/122, DIG. 7, 77, 245, 257, 258, 255

[56] References Cited

U.S. PATENT DOCUMENTS

| | | | |
|---|---|---|---|
| H827 | 10/1990 | Yamagishi | 264/74 |
| 2,806,509 | 9/1957 | Bozzacco et al. | 264/DIG. 7 |
| 3,219,735 | 11/1965 | Iverson et al. | 264/74 |
| 3,361,845 | 1/1968 | Watanabe et al. | |
| 3,371,135 | 2/1968 | Goodwin | 264/122 |
| 4,085,246 | 4/1978 | Buser et al. | 428/220 |
| 4,244,993 | 1/1981 | Platka, III et al. | 428/15 |
| 4,343,752 | 8/1982 | Cann | 264/73 |
| 4,890,366 | 1/1990 | Schaapveld | |
| 4,940,561 | 7/1990 | Fritz | 264/225 |
| 5,028,459 | 7/1991 | Lathrop | 428/15 |
| 5,043,377 | 8/1991 | Nogi et al. | 524/437 |
| 5,262,212 | 11/1993 | Waters | 428/35.7 |
| 5,270,105 | 12/1993 | Conroy et al. | 428/278 |
| 5,280,052 | 1/1994 | Questel et al. | 523/219 |
| 5,304,592 | 4/1994 | Ghahary | 524/437 |
| 5,342,565 | 8/1994 | Goren | 264/74 |

FOREIGN PATENT DOCUMENTS

| | | | |
|---|---|---|---|
| 2624950 | 12/1977 | Germany | 264/DIG. 7 |
| 53-1255 | 1/1978 | Japan | 264/74 |
| 59-171612 | 9/1984 | Japan | 264/74 |
| 040966 | 2/1986 | Japan . | |
| WO8901504 | 2/1989 | WIPO . | |
| WO9309170 | 5/1993 | WIPO . | |

OTHER PUBLICATIONS

Glass Microballon Particles, A low–Density Filler, H.E. Alford and F. Veatch, Nov. 1961, Modern Plastics, pp. 141, 142, 145, 146, 150, 223.

*Primary Examiner*—Mathieu D. Vargot
*Attorney, Agent, or Firm*—Buchanan Ingersoll, P.C.

[57] ABSTRACT

A method of forming a simulated stone and solid color plastic molded article includes a densified surface coating material that is sprayed on the surface of a mold. A glass fiber preform is inserted into the mold and the mold is filled with resin at low pressure. The densified coating material includes a matrix-forming resin and large and small densifier particles in a prescribed size ratio. Articles made in accordance with the method are also described.

16 Claims, 1 Drawing Sheet

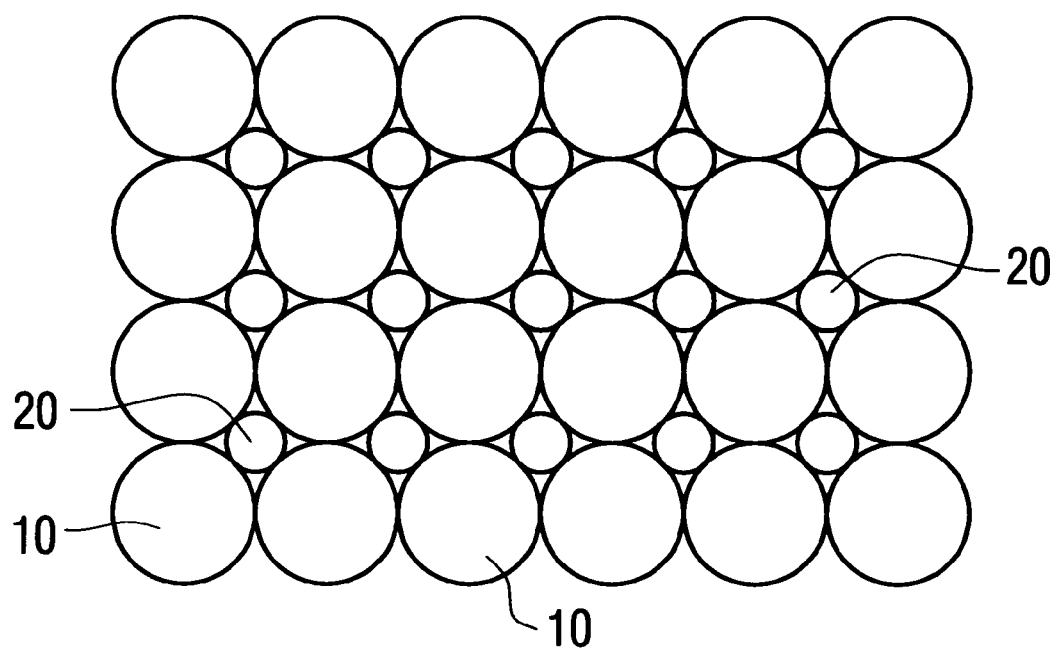

DENSIFIED COATING PROCESS AND MOLDED ARTICLES HAVING DENSIFIED OUTER SURFACE

TECHNICAL FIELD

The present invention relates generally to gel coat and fiberglass lamination processes by which articles such as counter tops, lavatories, and bathtubs are molded using various resins to produce a simulated marble, onyx or other decorative stone appearance. More specifically, the present invention is directed to a process for forming a decorative densified outer surface layer on a molded article.

BACKGROUND OF THE INVENTION

It is well known in the plastics molding art to produce molded articles which have the appearance of decorative stone such as marble. Often referred to as "cultured marble" these plastic molded articles can be manufactured for a fraction of the cost associated with real marble and have been accepted by consumers as aesthetically pleasing. A number of specific techniques have been used in the past to achieve the color striations or swirls in the surface layer of the plastic which approximates the look of real marble. Generally, these processes include the use of contrasting colorants, one for the resin matrix to give the base color and others which are added to produce the contrasting striations. By limiting the degree to which the striation colorants are admixed with the base resin, the marble appearance can be obtained.

In the manufacture of large molded articles such as sinks, bathtubs and lavatories, the molding process is typically carried out using the so-called "gel coat" process. In the gel coat process, a mold having a predetermined configuration is initially coated with a substantially clear, hardenable resin coating. This type of initial coating is referred to as the gel coat. After the gel coat is applied, a first layer of a resin and filler mixture is sprayed over the gel coat. Spraying has generally taken the place of the prior practice of casting although many gel coats do not adhere well to the mold when sprayed. Striations of opaque filler are then formed in the first layer of the resin/filler mixture. After the striated resin/filler layer has partially cured so as to form a tacky coating a layer of glass fibers is disposed over the layer and laminated thereon. The glass fibers may be pre-treated with a coating of a hardenable resin and a catalyst and the fiber-resin filler composition is permitted to cure at least to a tacky state. By utilizing a fiber layer, a high strength to weight ratio is achieved. A second layer of resin/filler mixture is applied over the glass fibers and permitted to cure. After final and total curing of the various layers has occurred, the product is removed from the mold. Prior art gel coat systems typically form a gel coat of from about 20–30 mils.

One type of molding process used for this purpose is resin transfer molding. In this process, the male mold is coated with the gel coat, the preform is dropped into the female mold, the mold is closed and the resin is injected into the mold cavity.

It is also known to use a gel coat which incorporates materials to produce the desired simulated stone appearance. For example, in PCT International publication No. wo 93/09170, a process of forming a plastic article which has the appearance of granite is disclosed in which the gel coat includes plastic granules. More specifically, granules made from the same resin as the gel coat, or a compatible resin, are mixed into the gel coat resin. In order to obtain even dispersion and suspension of the granules in the gel coat it is specified that they must have the same specific gravity as the gel coat resin matrix. The gel coat further contains aluminum trihydrate. A pigment/filler is used to mask the coloration of the backing material which is applied in the mold. The size of the aluminum trihydrate granules is disclosed as 20 microns average grain granule diameter. It is further disclosed therein that the alumina trihydrate constitutes up to about 50% by weight of the resin and that thixotropes may be added.

The molded articles produced using the prior art gel coat techniques suffer from a number of drawbacks such as problems associated with the differences in the coefficients of thermal expansion between the surface coating and the underlying materials. Particularly in the case of bath tubs, hot tubs, and lavatories and the like, this differential in thermal expansion can cause crazing and other surface distortions as the surface expands at a different rate than the underlying material. In addition the nature of conventional surface layers makes these materials difficult to repair where a scratch or crack develops on the surface of the article. The present invention is directed to solving these and other drawbacks associated with prior art techniques.

SUMMARY OF THE INVENTION

In one aspect the present invention provides a method for forming a molded article comprising the steps of preparing a densified coating material which contains a matrix-forming resin, a thickener, large densifier particles and small densifier particles; coating the surface of a mold cavity with the coating material; and backfilling the mold such that the coating material forms the surface of the molded article.

In another aspect, the matrix-forming resin is a pre-promoted thermoset polyester resin, the thickener is a thixotrope, the large densifier particles are a first specific fraction of aluminum trihydrate, the small densifier particles are a second specific fraction of alumina trihydrate, the size ratio of the average diameter of the particles of said first fraction to the size ratio of the average diameter of the particles of said second fraction being about 5 to 1.

In another aspect the densified coating material used in the invention also includes styrene monomer which acts as a cross-linking agent and which also serves as a diluent for the unreacted coating resin.

In one aspect the process of the present invention includes the step of spraying the coating on the male member of a mold cavity; placing a pre-formed fiberglass sheet on the female mold member and then backfilling the fiberglass sheet with a resin that forms the body of the article.

In still another aspect the densified coating material of the present invention includes multiple colorants to form a pattern which mimics a decorative stone surface.

In still another aspect the present invention provides an article manufactured by preparing a densified coating material which contains a matrix-forming resin, a thickener, large densifier particles and small densifier particles; coating the surface of a mold cavity with the coating material; and backfilling the mold such that the coating material forms the surface of the molded article.

These and other objects and advantages of the invention will be more fully appreciated in accordance with the following detailed description of the preferred embodiments with reference to the drawing.

BRIEF DESCRIPTION OF THE DRAWING

The drawing is a diagrammatic view of the interaction of the large and small densifier particles in the coatings of the present invention.

DETAILED DESCRIPTION OF THE PREFERRED EMBODIMENTS OF THE INVENTION

In accordance with the preferred embodiments of the invention a process is provided for forming a molded article having desirable surface characteristics. Although the method of the invention will be described with reference to the technique known as "resin transfer molding" it is to be understood that is suitable for use in other molding process such as RIM and open mold processes.

As will be known to those skilled in the art, resin transfer molding is a process in which resins, preferably thermosetting resins, are used in a low pressure injection molding environment. The resin is injected into the mold cavity over a preform reinforcement, typically a glass fiber mat.

Accordingly, the first step in the process is the application of a mold release agent to the surfaces of the mold cavity which will allow the finished product to be removed from the mold cavity. A number of mold release agents are available for this purpose such as carnuba wax. Following the application of a release agent, the surface of the mold which will form the exterior or show surface of the article is coated with the densified coating material of the present invention. It will be appreciated that the gloss characteristics of the finished article can be controlled by the surface characteristics of the inner mold surface. For most applications, a semi-gloss surface will be suitable.

The densified coating of the present invention forms the first layer of the finished article. The preferred densified coating material has characteristics of a gel coat but provides a number of advantages over traditional gel coat processes. It is specially formulated to provide good flexibility, surface finish, stain resistance and thermal characteristics.

The first component of the densified coating material is a resin. The resin forms a "matrix" for the particulate constituents of the densified coating material. Most preferred are thermosetting resins, although in some applications it may be possible to use a thermoplastic, such as a thermoplastic polyester. The most preferred thermosetting resins are polyester resins and epoxy resins. Most preferred are thermosetting polyester resins. Suitable polyester resins are those prepared from polymerizable unsaturated polyesters such as those prepared from ethylenically unsaturated polycarboxcylic acids and polyhydric alcohols. One particularly preferred polyester resin is sold under the trade name Polylite by Reichhold Chemicals Inc. The resin component of the densified coating material comprises from about 30 to about 50 percent by weight of the densified coating material and more preferably from about 40 about 50 percent by weight. All percentages herein are stated as percent by weight unless otherwise indicated or unless the context so indicates.

The resin component should generally have a viscosity of about 900 to about 1200 centipoise as measured by ASTM 1824-90 (used hereinafter for viscosity).

Another component of the densified coating material is a curing agent. It is preferred that the resin component of the present invention be provided in promoted form. That is, that the resin include a promoter or accelerator for the cross-linking of the resin polymer. A number of commercial sources distribute pre-promoted resins as will be appreciated by those skilled in the art. Alternatively, if longer pot life is desired or if greater control over environmental conditions is required, unpromoted resin may be utilized which is then mixed with promoter shortly before application of the densified coating material to the mold surface. Suitable promoters for use in the present invention are cobalt naphthanate and dimethylaniline. Other promoters may be suitable or desirable in a particular application. In addition to a promoter, an initiator or catalyst is utilized in the densified coating material to initiate cross-linking of the resin as will be more fully explained hereinafter. Preferred initiators are organic peroxides, methylethyl keytone peroxide and acetyl acetone peroxide.

The densified coating material of the invention also preferably includes a thickening agent, preferably a thixotrope. A number of thixotropes may be used in the invention such as clay pregels and fumed silica. Most preferred is fumed silica. A thixotrope comprises from about 0.5 to about 5 percent by weight and more preferably from about 1 to about 3 percent by weight of the densified coating material of the present invention. The thixotrope allows the densified coating material to be sprayed readily using conventional equipment at high shears and yet provides sufficient viscosity so that the material will adhere well to the mold surfaces in relatively thick layers.

The next component of the densified coating material is a plurality of large densifier particles and the fourth component is a plurality of small densifier particles. As will be explained more fully herein, the combination of large densifier particles and small densifier particles in the densified coating material of the present invention assists in creating the desired unique properties of the coating material. The large densifier particles are a particulate material which is preferably generally spherical. A number of large densifier particles may be suitable in the present invention. Most preferred is alumina trihydrate. Other material which may be suitable are $CaCO_3$ and $CaSO_4$ and silica. The large densifier particles have an average particle diameter of from about 35 microns to about 50 microns and more preferably from about 40 microns to about 50 microns. To achieve this average diameter, the particles in the large densifier particles are preferably within the range (spread) of from about 10 microns to about 65 microns in diameter. The large densifier particles preferably comprises from about 20 to about 40 percent by weight and more preferably from about 20 to about 30% by weight of the total densified coating material.

Another component of the densified coating material of the invention is a plurality of small densifier particles. A number of small densifier particles may be suitable in the present invention. Most preferred is alumina trihydrate. Other materials which may be suitable are $CaCO_3$ and $CaSO_4$ and silica. The small densifier particles have an average particle diameter of from about 8 microns to about 15 microns and more preferably from about 5 microns to about 10 microns. To achieve this average diameter, the particles in the small densifier particles are preferably within the range (spread) of from about 3 microns to about 20 microns in diameter. The small densifier particles preferably comprises from about 20 to about 40 percent by weight and more preferably from about 20 to about 30 by weight of the total densified coating material.

An important feature of the present invention is achieved by the relative sizes of the large densifier particles and the small densifier particles. Referring now to the FIGURE, it is believed that by providing large densifier particles 10 and small densifier particles 20, they cooperate to form a network of particles which provide a dense outer surface of the finished part. This dense outer surface, in combination with the relatively thick coating of the densified coating material act synergistically to provided a surface which having a good surface finish, stain resistance and thermal characteristics in terms of resistance to thermal stresses which may induce cracks and the like. Accordingly, the large densifier particles 10 form a network which defines interstices that are filled by small densifier particles 20 as shown in the FIGURE. Thus, the ratio of the diameter of the large densifier particle to that of the small densifier particles is preferably in the range of about 8 to 1 to about 4 to 1 and more preferably about 6 to 1 to about 5.5 to 1.

In some instances, it may be desirable to eliminate the thixotrope and control viscosity solely with the large and small densifier particles. The densified coating material as fully compounded should have a viscosity of 4,000 centipoise to about 30,000 centipoise and more preferably from about 18,000 to about 22,000 centipoise.

A preferred additional component of the densified coating material of the present invention is a cross-linking diluent. The cross-linking diluent serves to lower the viscosity of the densified coating material while simultaneously assisting in the cross-linking reaction of the principal resin, i.e. it becomes part of the polymer network of the finished resin. The preferred cross-linking diluent is a resin monomer such as styrene monomer or methylmethacrylate. Cross-linking diluent comprises from about 38 to about 55 percent by weight and more preferably from about 35 to about 45 percent by weight of the densified coating material.

A number of additives may also be included in the densified coating material such as antioxidants, antiozonants, coupling agents, impact modifiers, heat stabilizers, ultraviolet absorbers, air releases to reduce porosity and processing aids.

In one embodiment, the densified coating material includes a pigment such as $TiO_2$ or the like to produce a solid, uniform color to the surface of the molded article. The amount of pigment added will vary but the final pigmented densified coating should have a viscosity in the preferred range stated above. In another preferred embodiment, the densified coating material includes various colorants to produce a decorative stone appearance.

It is preferred that the densified coating material contain form about 1 percent by weight to about 10 percent by weight of a colorant such as dyes, organic pigments, inorganic pigments. Special effect pigments such as metal or plastic flakes may also be used. Most preferred is acrylic at a concentration of from about 0.5 percent to about 5 percent by weight. Once fully blended to produce a uniform coloration, a second (or more) contrasting colorant may be added which dissolves slowly to form the striations that provide the simulated marble appearance as the material is sprayed.

In compounding the densified coating material the dry materials are added to the resin which typically increases the viscosity to 80,000 to 100,000 centipoise. The styrene monomer, which is a liquid, is then added to reduce the viscosity to between about 25,000 and 15,000 centipoise. Other liquid ingredients may be generally added at any stage. The initiator will typically be added as the material is sprayed onto a mold surface though the use of a conventional mixing spray applicator.

The inventive densified coating material is utilized in the method of the present invention to form unique plastic articles such as lavatories, bathtubs, hot tubs, counter tops, kitchen sinks, bar sinks and decorative furniture. Accordingly, the densified coating material is sprayed (as initiator is added) onto the surface of a mold cavity, generally the male mold member, after the application of a release agent. The thickness of the applied coating should be from about 80 to 150 mils and more preferably about 125 mils thick. The coating material can be applied at a rate of about 3 to 8 lbs/min.

Approximately 5 to about 10 minutes after the application of the densified coating material to the mold surface, a glass fiber preform (fiberglass) is placed in the female cavity and the mold is closed. A resin such as polyester or vinylester or polyester/urethane hybrid is then injected under low pressure (10 to 50 psig) to fill the mold cavity. That is, the densified coating material which will form the show surface of the molded article is backfilled with resin. The backfill or charge resin penetrates the glass fiber mat such that the mat, the densified coating material and the injected resin are intimately bonded together. Of course, it is important that the mat does not drift in the mold cavity through the densified coating material. In other words, no portion of the fiber glass mat should be exposed at the show surface.

After the material is allowed to cure, the mold is opened and the molded article is removed. Post-molding finishing techniques such as buffing or the like may be used where appropriate.

It has been found that molded articles made in accordance with the present invention have superior resistance to thermally induced cracking and the like, which is believed to be due to the combination of the thickness of the applied surface coat and the interaction of the large and small densifier particles. The finished article is particularly well suited for minor repairs by sanding and the like in which it has been found that the appearance of the repair site is almost identical to the original surface in many instances. This again is attributed to the depth of the surface coating and the ratio of densifier particles.

Thus it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for forming a molded article comprising the steps of preparing a densified coating material which contains a matrix-forming resin and a distribution of densifier particles, said distribution of densifier particles comprising a large densifier particle fraction, said particles of said large densifier particle fraction having an average diameter of about 35 microns to 50 microns, and a small densifier particle fraction, said particles of said small densifier particle fraction having an average diameter of from about 8 microns to about 15 microns; wherein the average diameter of the particles of said large densifier particle fraction has a ratio to the average diameter of the particles of said small densifier particle fraction of from about 6 to 1 to about 5.5 to 1; coating a surface of a mold cavity with the densified coating material; and backfilling the mold such that the densified coating material forms a surface of the molded article.

2. The method recited in claim 1, further including the step of placing a preform in the mold cavity.

3. The method recited in claim 1, wherein said matrix-forming resin is a thermosetting resin and further comprising the step of including a curing agent in said resin.

4. The method recited in claim 3, wherein said matrix-forming resin is a thermosetting polyester resin.

5. The method recited in claim 1, wherein said densified coating material includes a thixotrope.

6. The method recited in claim 1, wherein the particles of said large densifier particle fraction range from about 10 to 65 microns in diameter, said particles of said small densifier particle fraction range from about 3 to 20 microns in diameter, and wherein the average diameter of the particles of said large densifier particle fraction has a ratio to the average diameter of the particles of said small densifier particle fraction of from about 6 to 1 to about 5.5 to 1.

7. The method recited in claim 1, wherein said particles of said large densifier particle fraction and said particles of said small densifier particle fraction are aluminum trihydrate.

8. The method recited in claim 1, wherein said densified coating material further includes a pigment.

9. The method recited in claim 1, wherein said densified coating material has a simulated stone appearance.

10. The method recited in claim 1, wherein said densified coating material is applied in a thickness of from about 80 to about 150 mils.

11. The method recited in claim 1, wherein said densified coating material further includes a diluent/cross-linking agent.

12. The method recited in claim 11, wherein said diluent/cross-linking agent is styrene monomer.

13. The method recited in claim 2, wherein said preform is a glass fiber mat.

14. The method recited in claim 1, wherein said densified coating material is applied to said mold by spraying.

15. The method recited in claim 1, wherein said molded article is selected from the group consisting of bathtubs, lavatories, hot tubs, counter tops, kitchen sinks, bar sinks and decorative furniture.

16. The method of claim 1 wherein said large densifier particle fraction comprises from about 20 weight % to about 40 weight % of the total densified coating material and said small densifier particle fraction comprises from about 20 weight % to about 40 weight % of the total densified coating material.

* * * * *